(12) United States Patent
Li et al.

(10) Patent No.: US 9,872,243 B2
(45) Date of Patent: Jan. 16, 2018

(54) METHOD FOR SELECTING CONTROLLER IN NETWORK AND STATION DEVICE

(71) Applicant: Huawei Technologies Co., Ltd., Shenzhen (CN)

(72) Inventors: Dejian Li, Beijing (CN); Pei Liu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 127 days.

(21) Appl. No.: 14/853,762

(22) Filed: Sep. 14, 2015

(65) Prior Publication Data

US 2016/0007277 A1  Jan. 7, 2016

Related U.S. Application Data

(63) Continuation of application No. PCT/CN2014/073514, filed on Mar. 17, 2014.

(30) Foreign Application Priority Data

Mar. 15, 2013 (CN) .......................... 2013 1 0084044

(51) Int. Cl.
H04W 72/04 (2009.01)
H04W 48/20 (2009.01)
(Continued)

(52) U.S. Cl.
CPC ........... *H04W 48/20* (2013.01); *H04W 24/02* (2013.01); *H04W 72/0453* (2013.01);
(Continued)

(58) Field of Classification Search
CPC . H04W 24/02; H04W 48/20; H04W 72/0453; H04W 84/20; H04W 88/02; H04W 88/08
(Continued)

(56) References Cited

U.S. PATENT DOCUMENTS

2008/0112364 A1  5/2008  Kwon et al.
2010/0315980 A1  12/2010  Chu et al.
(Continued)

FOREIGN PATENT DOCUMENTS

CN   102265668 A   11/2011
CN   102711223 A   10/2012
(Continued)

OTHER PUBLICATIONS

"PCP Selection Considering Supported Channels Capability," IEEE 802.11-13/1183r0, Sep. 15, 2013, 12 pages.
(Continued)

*Primary Examiner* — Robert Lopata
(74) *Attorney, Agent, or Firm* — Slater Matsil, LLP

(57) ABSTRACT

The present invention provides a method for selecting a network controller and a station device. Supported channel width sets of multiple station STA devices are acquired; a PCP factor of the each STA device is generated according to a supported channel width set and an acquired directional multi-gigabit DMG capability information element of the each STA device, where the PCP factor includes the supported channel width set; a STA device with a largest PCP factor is selected as a PCP. Using the method for selecting a PCP and the STA device provided in the present invention can improve reliability of a wireless local area network WLAN.

16 Claims, 5 Drawing Sheets

---

```
┌──────────────────────────────────────────────────────────┐
│ A STA device acquires supported channel width sets of   │  201
│ multiple STA devices                                     │
└──────────────────────────────────────────────────────────┘
                          │
                          ▼
┌──────────────────────────────────────────────────────────┐
│ The STA device acquires information about a total       │
│ quantity of sectors, power source information,          │
│ decentralized PCP/AP cluster information, TDDTI         │
│ information, pseudo static allocation information, and  │
│ information about a maximum quantity of associated      │  202
│ STAs of each of the STA device according to acquired    │
│ DMG capability information elements of the multiple     │
│ STA devices, and sorts the foregoing information and a  │
│ supported channel width set in a preset order, to       │
│ generate a PCP factor of each of the STA device         │
└──────────────────────────────────────────────────────────┘
                          │
                          ▼
┌──────────────────────────────────────────────────────────┐
│ The STA device selects a STA device with a largest PCP  │  203
│ factor as a PCP                                          │
└──────────────────────────────────────────────────────────┘
```

(51) Int. Cl.
*H04W 24/02* (2009.01)
*H04W 84/20* (2009.01)
*H04W 88/02* (2009.01)
*H04W 88/08* (2009.01)

(52) U.S. Cl.
CPC ............ *H04W 84/20* (2013.01); *H04W 88/02* (2013.01); *H04W 88/08* (2013.01)

(58) Field of Classification Search
USPC ........................................................ 370/329
See application file for complete search history.

(56) References Cited

U.S. PATENT DOCUMENTS

| | | | |
|---|---|---|---|
| 2011/0154039 A1 | 6/2011 | Liu et al. | |
| 2011/0255401 A1 | 10/2011 | Seok | |
| 2011/0274084 A1 | 11/2011 | Chu et al. | |
| 2012/0106375 A1 | 5/2012 | Woo | |
| 2012/0173620 A1 | 7/2012 | Holostov et al. | |
| 2012/0177016 A1* | 7/2012 | Trainin | H04W 84/20 370/338 |
| 2013/0329600 A1* | 12/2013 | Vedula | H04W 76/023 370/254 |
| 2014/0078928 A1* | 3/2014 | Verma | H04W 84/20 370/254 |
| 2014/0369330 A1* | 12/2014 | Sinha | H04W 8/005 370/338 |
| 2015/0180970 A1* | 6/2015 | Verma | H04W 84/20 370/254 |

FOREIGN PATENT DOCUMENTS

| | | |
|---|---|---|
| CN | 102726080 A | 10/2012 |
| CN | 103179639 A | 6/2013 |
| WO | 2013187664 A1 | 12/2013 |

OTHER PUBLICATIONS

"Part 11: Wireless LAN Medium Access Control (MAC) and Physical Layer (PHY) Specifications, Amendment 3: Enhancements for Very High Throughput in the 60 GHz Band," IEEE Standard for Information Technology-Telecommunications and Information Exchange Between Systems, Local and Metropolitan Area Networks—Specific Requirements, IEEE 802.11ad, Dec. 28, 2012, 628 pages.

* cited by examiner

| B0 | B1 | B2 B3 | B10 | B11 | B12 |
|---|---|---|---|---|---|
| TDD time slot information | Pseudo static allocation information | PCP handover information | Information about a maximum quantity of associated STAs | Power source information | Decentralized PCP/AP cluster information |

Bit   1   1   1   8   1   1

| B13 | B14 | B15 | B16    B18 | B19    B23 |
|---|---|---|---|---|
| PCP forwarding information | Centralized PCP/AP cluster information | Supported channel width set exists | Supported channel bandwidth | Reserved field |

Bit   1   1   1   3   5

FIG. 3a

| | B0 | B1 | B2 | B3 | B4 B5 | B6 | B7 B13 |
|---|---|---|---|---|---|---|---|
| | Reverse | High-level clock synchro-nization | Sending power control | Space share and multiplexing control | Quantity of DMG receive antennas | Fast link adaptation | Total quantity of sectors |
| Bit | 1 | 1 | 1 | 1 | 2 | 1 | 7 |

| | B14 B19 | B20 | B21 B26 | B27 | B28 B51 | B52 |
|---|---|---|---|---|---|---|
| | Scanning length of a receive sector | DMG antenna reciprocity | Parameter of an aggregated MAC layer protocol data unit | Block acknowledge-ment with traffic control | Supported modulation and coding scheme set | Supporting dynamic subcarrier pair |
| Bit | 6 | 1 | 6 | 1 | 24 | 7 |

| | B53 | B54 | B55 | B56 B57 | B59 | B60 |
|---|---|---|---|---|---|---|
| | Supporting aggregated physical layer convergence data unit | Activity signal | Supporting another correlation number | Reciprocity of antenna modes | Expiry indication of an activity signal | Supporting grant and acknowledgement |
| Bit | 1 | 1 | 1 | 1 | 3 | 1 |

| | B61 | B62 | B63 B64 | B66 B67 | B71 |
|---|---|---|---|---|---|
| | Supported scanning and sending rate of a receive sector | Supported channel width set exists | Reserved field | Supported channel width set | Reserved field |
| Bit | 1 | 1 | 1 | 3 | 5 |

FIG. 3b

| Reserved field | Information about a maximum quantity of associated STAs | Information about a total quantity of sectors | Pseudo static allocation information | TDD time slot information | Channel bandwidth parameter | Decentralized PCP/AP cluster information | Power source information | Reserved field |
|---|---|---|---|---|---|---|---|---|
| B0  B3 | B4  B11 | B12  B18 | B19 | B20 | B21  B23 | B24 | B25 | B26  B31 |
| 4 | 8 | 7 | 1 | 1 | 3 | 1 | 1 | 6 |

Bit

METHOD FOR SELECTING CONTROLLER IN NETWORK AND STATION DEVICE

This application is a continuation of International Application No. PCT/CN2014/073514, filed on Mar. 17, 2014, which claims priority to Chinese Patent Application No. 201310084044.2, filed on Mar. 15, 2013, both of which are hereby incorporated by reference in their entireties.

TECHNICAL FIELD

The present invention relates to communications technologies, and in particular to, a method for selecting a network controller, for example, a personal basic service set (PBSS) Control Point, (PCP) and a station (STA) device.

BACKGROUND

60 GHz wireless communication belongs to millimeter wave communication and is widely applied in many fields, such as communications, radar, navigation, remote sensing, and radio astronomy.

In the American Institute of Electrical and Electronics Engineers (IEEE) 802.11ad standard, a frequency band of 57-66 GHz is divided into four equal-bandwidth channels of 2.16 GHz, and one STA is selected from common STAs of a wireless local area network (WLAN) and serves as a role of a PCP, which achieves flexible networking without requiring an access point (AP) device. According to the IEEE 802.11ad standard, when a STA accesses a network, a process of PCP selection is performed to determine whether the STA is used as a PCP; or before a STA that is currently used as a PCP leaves the network, a process of PCP selection is performed to determine a next STA that is to be used as the PCP. In the foregoing process of PCP selection, selection is performed according to information, such as a power source and a decentralized PCP/AP cluster, in capability information of the each STA.

In a millimeter wave communications network in the prior art, an available frequency band of the 60 GHz wireless communication is 59-64 GHz, which includes six logical channels with unequal bandwidth, which are specifically two channels whose bandwidth is 2.16 GHz and four channels whose bandwidth is 1.08 GHz. In addition to a frequency band of 60 GHz, a frequency band of 45 GHz is also used in millimeter wave communication, and a frequency band of 43.5 GHZ-47 GHz is divided into four types of channel bandwidth: 2.16 GHz, 1.08 GHz, 540 MHz, and 270 MHz. Because the foregoing improvement is performed on the millimeter wave communications network, multiple types of channel bandwidth exist in the improved millimeter wave communications network; by using a method for selecting a PCP put forward in the IEEE 802.11ad standard, the PCP is selected only according to information such as a power source and a decentralized PCP/AP cluster, which cannot ensure that the selected PCP has a capability to support multiple types of channel bandwidth, thereby causing poor reliability of a WLAN.

SUMMARY

According to a first aspect of the present invention, a method for selecting a network controller is provided to solve a defect in the prior art and to improve reliability of a WLAN.

According to another aspect of the present invention, a station device is provided to solve the defect in the prior art and improve reliability of a WLAN.

The first aspect of the present invention provides the method for selecting a network controller PCP, including:
acquiring supported channel width sets of multiple station STA devices;
generating a PCP factor of each STA device according to a supported channel width set and an acquired directional multi-gigabit DMG capability information element of the each STA device, where the PCP factor includes the supported channel width set; and
selecting a STA device with a largest PCP factor as the PCP.

The foregoing aspect and any one of possible implementation manners further provide an implementation manner, where the acquiring supported channel width sets of multiple station STA devices includes:
acquiring DMG capability information elements of the multiple STA devices, where the DMG capability information elements include: DMG STA capability information and DMG network controller or access point PCP/AP capability information, where the DMG STA capability information or the DMG PCP/AP capability information includes the supported channel width sets; or
acquiring country information elements or supported operating classes information elements of the multiple STA devices, and acquiring the supported channel width sets according to channel spacing fields and channel starting frequency fields in the country information elements or the supported operating classes information elements.

The foregoing aspect and any one of possible implementation manners further provide an implementation manner, where
the acquired DMG capability information element includes: DMG STA capability information and DMG PCP/AP capability information;
the DMG STA capability information includes: information about a total quantity of sectors;
the DMG PCP/AP capability information includes: power source information, decentralized PCP/AP cluster information, time division data transfer interval TDDTI information, pseudo static allocation information, and information about a maximum quantity of associated STAs; and
the generating a PCP factor of each STA device according to a supported channel width set and an acquired DMG capability information element of the each STA device includes: acquiring the information about the total quantity of sectors, the power source information, the decentralized PCP/AP cluster information, the TDDTI information, the pseudo static allocation information, and the information about the maximum quantity of associated STAs of the each STA device according to the DMG capability information element of the each STA device; and sorting the information about the total quantity of sectors, the power source information, the decentralized PCP/AP cluster information, the TDDTI information, the pseudo static allocation information, the information about the maximum quantity of associated STAs, and the supported channel width set in a preset order, to generate the PCP factor of the each STA device.

The foregoing aspect and any one of possible implementation manners further provide an implementation manner, where the preset order includes:
sorting the following information in an order from a most significant bit to a less significant bit: the power source information, the decentralized PCP/AP cluster information, the supported channel width set, the TDDTI information, the pseudo static allocation information, the information about the total quantity of sectors, and the information about the maximum quantity of associated STAs; or sorting the following information in an order from a most significant bit to a less significant bit: the power source information, the supported channel width set, the decentralized PCP/AP cluster information, the TDDTI information, the pseudo static allocation information, the information about the total quantity of sectors, and the information about the maximum quantity of associated STAs.

The foregoing aspect and any one of possible implementation manners further provide an implementation manner, where the supported channel width set includes: a first value, a second value, a third value, a fourth value, a fifth value, a sixth value or a seventh value, where the first value is used to indicate that the STA supports a channel whose frequency band is 60 GHz and bandwidth is 1.08 GHz; the second value is used to indicate that the STA supports a channel whose frequency band is 60 GHz and bandwidth is 1.08 GHz and a channel whose frequency band is 45 GHz and bandwidth is 1.08 GHz; the third value is used to indicate that the STA supports a channel whose frequency band is 60 GHz and bandwidth is 1.08 GHz and 2.16 GHz; the fourth value is used to indicate that the STA supports a channel whose frequency band is 60 GHz and bandwidth is 1.08 GHz and 2.16 GHz and a channel whose frequency band is 45 GHz and bandwidth is 1.08 GHz; the fifth value is used to indicate that the STA supports a channel whose frequency band is 60 GHz and bandwidth is 1.08 GHz and 2.16 GHz and a channel whose frequency band is 45 GHz and bandwidth is 1.08 GHz and 2.16 GHz; the sixth value is used to indicate that the STA supports a channel whose frequency band is 60 GHz and bandwidth is 1.08 GHz and 2.16 GHz and a channel whose frequency band is 45 GHz and bandwidth is 1.08 GHz, 2.16 GHz, and 540 MHz; and the seventh value is used to indicate that the STA supports a channel whose frequency band is 60 GHz and bandwidth is 1.08 GHz and 2.16 GHz and a channel whose frequency band is 45 GHz and bandwidth is 1.08 GHz, 2.16 GHz, 540 MHz, and 270 MHz; or the supported channel width set includes: a first value, a second value, a third value or a fourth value, where the first value is used to indicate that the STA supports a channel whose frequency band is 60 GHz and bandwidth is 1.08 GHz; the second value is used to indicate that the STA supports a channel whose frequency band is 60 GHz and bandwidth is 1.08 GHz and 2.16 GHz; the third value is used to indicate that the STA supports a channel whose frequency band is 60 GHz and bandwidth is 1.08 GHz, 2.16 GHz, and 4.32 GHz; and the fourth value is used to indicate that the STA supports a channel whose frequency band is 60 GHz and bandwidth is 1.08 GHz, 2.16 GHz, 4.32 GHz, and 3.24 GHz; or the supported channel width set includes: a first value, a second value, a third value or a fourth value, where the first value is used to indicate that the STA supports a channel whose frequency band is 45 GHz and bandwidth is 1.08 GHz; the second value is used to indicate that the STA supports a channel whose frequency band is 45 GHz and bandwidth is 1.08 GHz and 540 MHz; the third value is used to indicate that the STA supports a channel whose frequency band is 45 GHz and bandwidth is 1.08 GHz, 540 MHz, and 270 MHz; and the fourth value is used to indicate that the STA supports a channel whose frequency band is 45 GHz and bandwidth is 1.08 GHz, 540 GHz, 270 MHz, and 2.16 GHz.

Another aspect of the present invention provides a station STA device, including:

an acquiring unit, configured to acquire supported channel width sets and directional multi-gigabit DMG capability information elements of multiple STA devices;

a generating unit, configured to generate a network controller PCP factor of the each STA device according to a supported channel width set and an acquired DMG capability information element of the each STA device, where the PCP factor includes the supported channel width set; and a selecting unit, configured to select a STA device with a largest PCP factor as a PCP.

The foregoing aspect and any one of possible implementation manners further provide an implementation manner, where the acquiring unit is specifically configured to acquire the DMG capability information elements of the multiple STA devices, where the DMG capability information elements include: DMG STA capability information and DMG network controller or access point PCP/AP capability information, where the DMG STA capability information or the DMG PCP/AP capability information includes the supported channel width sets;

or, the acquiring unit is specifically configured to: acquire country information elements or supported operating classes information elements of the multiple STA devices, and acquire the supported channel width sets according to channel spacing fields and channel starting frequency fields in the country information elements or the supported operating classes information elements.

The foregoing aspect and any one of possible implementation manners further provide an implementation manner, where the DMG capability information element acquired by the acquiring unit includes: DMG STA capability information and DMG PCP/AP capability information;

the DMG STA capability information includes: information about a total quantity of sectors;

the DMG PCP/AP capability information includes: power source information, decentralized PCP/AP cluster information, time division data transfer interval TDDTI information, pseudo static allocation information, and information about a maximum quantity of associated STAs; and the generating unit is specifically configured to: acquire the information about the total quantity of sectors, the power source information, the decentralized PCP/AP cluster information, the TDDTI information, the pseudo static allocation information, and the information about the maximum quantity of associated STAs of the each STA device according to the DMG capability information element of the each STA device; and sort the information about the total quantity of sectors, the power source information, the decentralized PCP/AP cluster information, the TDDTI information, the pseudo static allocation information, the information about the maximum quantity of associated STAs, and the supported channel width set in a preset order, to generate the PCP factor of the each STA device.

The foregoing aspect and any one of possible implementation manners further provide an implementation manner, where the preset order includes:

sorting the following information in an order from a most significant bit to a less significant bit: the power source information, the decentralized PCP/AP cluster information, the supported channel width set, the TDDTI information, the pseudo static allocation information, the information about the total quantity of sectors, and the information about the maximum quantity of associated STAs; or sorting the following information in an order from a most significant bit to a less significant bit: the power source information, the supported channel width set, the decentralized PCP/AP cluster information, the TDDTI information, the pseudo static allocation information, the information about the total quantity of sectors, and the information about the maximum quantity of associated STAs.

The foregoing aspect and any one of possible implementation manners further provide an implementation manner, where the supported channel width set includes: a first value, a second value, a third value, a fourth value, a fifth value, a sixth value or a seventh value, where the first value is used to indicate that the STA supports a channel whose frequency band is 60 GHz and bandwidth is 1.08 GHz; the second value is used to indicate that the STA supports a channel whose frequency band is 60 GHz and bandwidth is 1.08 GHz and a channel whose frequency band is 45 GHz and bandwidth is 1.08 GHz; the third value is used to indicate that the STA supports a channel whose frequency band is 60 GHz and bandwidth is 1.08 GHz and 2.16 GHz; the fourth value is used to indicate that the STA supports a channel whose frequency band is 60 GHz and bandwidth is 1.08 GHz and 2.16 GHz and a channel whose frequency band is 45 GHz and bandwidth is 1.08 GHz; the fifth value is used to indicate that the STA supports a channel whose frequency band is 60 GHz and bandwidth is 1.08 GHz and 2.16 GHz and a channel whose frequency band is 45 GHz and bandwidth is 1.08 GHz and 2.16 GHz; the sixth value is used to indicate that the STA supports a channel whose frequency band is 60 GHz and bandwidth is 1.08 GHz and 2.16 GHz and a channel whose frequency band is 45 GHz and bandwidth is 1.08 GHz, 2.16 GHz, and 540 MHz; and the seventh value is used to indicate that the STA supports a channel whose frequency band is 60 GHz and bandwidth is 1.08 GHz and 2.16 GHz and a channel whose frequency band is 45 GHz and bandwidth is 1.08 GHz, 2.16 GHz, 540 MHz, and 270 MHz; or the supported channel width set includes: a first value, a second value, a third value or a fourth value, where the first value is used to indicate that the STA supports a channel whose frequency band is 60 GHz and bandwidth is 1.08 GHz; the second value is used to indicate that the STA supports a channel whose frequency band is 60 GHz and bandwidth is 1.08 GHz and 2.16 GHz; the third value is used to indicate that the STA supports a channel whose frequency band is 60 GHz and bandwidth is 1.08 GHz, 2.16 GHz, and 4.32 GHz; and the fourth value is used to indicate that the STA supports a channel whose frequency band is 60 GHz and bandwidth is 1.08 GHz, 2.16 GHz, 4.32 GHz, and 3.24 GHz; or the supported channel width set includes: a first value, a second value, a third value or a fourth value, where the first value is used to indicate that the STA supports a channel whose frequency band is 45 GHz and bandwidth is 1.08 GHz; the second value is used to indicate that the STA supports a channel whose frequency band is 45 GHz and bandwidth is 1.08 GHz and 540 MHz; the third value is used to indicate that the STA supports a channel whose frequency band is 45 GHz and bandwidth is 1.08 GHz, 540 MHz, and 270 MHz; and the fourth value is used to indicate that the STA supports a channel whose frequency band is 45 GHz and bandwidth is 1.08 GHz, 540 GHz, 270 MHz, and 2.16 GHz.

Still another aspect of the present invention provides a station STA device, including:

a receiver, configured to acquire supported channel width sets and directional multi-gigabit DMG capability information elements of multiple STA devices;

a processor, configured to: generate a network controller PCP factor of the each STA device according to a supported channel width set and an acquired DMG capability information element of the each STA device, where the PCP factor includes the supported channel width set, and select a STA device with a largest PCP factor as a PCP; and a bus, configured to implement communication between the receiver and the processor.

The foregoing aspect and any one of possible implementation manners further provide an implementation manner, where the receiver is specifically configured to acquire the DMG capability information elements of the multiple STA devices, where the DMG capability information elements include: DMG STA capability information and DMG network controller or access point PCP/AP capability information, where the DMG STA capability information or the DMG PCP/AP capability information includes the supported channel width sets;

or, the receiver is specifically configured to: acquire country information elements or supported operating classes information elements of the multiple STA devices, and acquire the supported channel width sets according to channel spacing fields and channel starting frequency fields in the country information elements or the supported operating classes information elements.

The foregoing aspect and any one of possible implementation manners further provide an implementation manner, where the DMG capability information element acquired by the receiver includes: DMG STA capability information and DMG PCP/AP capability information;

the DMG STA capability information includes: information about a total quantity of sectors;

the DMG PCP/AP capability information includes: power source information, decentralized PCP/AP cluster information, time division data transfer interval TDDTI information, pseudo static allocation information, and information about a maximum quantity of associated STAs; and the processor is specifically configured to: acquire the information about the total quantity of sectors, the power source information, the decentralized PCP/AP cluster information, the TDDTI information, the pseudo static allocation information, and the information about the maximum quantity of associated STAs of the each STA device according to the DMG capability information element of the each STA device; and sort the information about the total quantity of sectors, the power source information, the decentralized PCP/AP cluster information, the TDDTI information, the pseudo static allocation information, the information about the maximum quantity of associated STAs, and the supported channel width set in a preset order, to generate the PCP factor of the each STA device, and select the STA device with the largest PCP factor as the PCP.

The foregoing aspect and any one of possible implementation manners further provide an implementation manner, where the preset order includes:

sorting the following information in an order from a most significant bit to a less significant bit: the power source information, the decentralized PCP/AP cluster information, the supported channel width set, the TDDTI information, the pseudo static allocation information, the information about the total quantity of sectors, and the information about the maximum quantity of associated STAs; or sorting the following information in an order from a most significant bit to a less significant bit: the power source information, the supported channel width set, the decentralized PCP/AP cluster information, the TDDTI information, the pseudo static allocation information, the information about the total quantity of sectors, and the information about the maximum quantity of associated STAs.

The foregoing aspect and any one of possible implementation manners further provide an implementation manner, where the supported channel width set includes: a first value, a second value, a third value, a fourth value, a fifth value, a sixth value or a seventh value, where the first value is used to indicate that the STA supports a channel whose frequency band is 60 GHz and bandwidth is 1.08 GHz; the second value is used to indicate that the STA supports a channel whose frequency band is 60 GHz and bandwidth is 1.08 GHz and a channel whose frequency band is 45 GHz and bandwidth is 1.08 GHz; the third value is used to indicate that the STA supports a channel whose frequency band is 60 GHz and bandwidth is 1.08 GHz and 2.16 GHz; the fourth value is used to indicate that the STA supports a channel whose frequency band is 60 GHz and bandwidth is 1.08 GHz and 2.16 GHz and a channel whose frequency band is 45 GHz and bandwidth is 1.08 GHz; the fifth value is used to indicate that the STA supports a channel whose frequency band is 60 GHz and bandwidth is 1.08 GHz and 2.16 GHz and a channel whose frequency band is 45 GHz and bandwidth is 1.08 GHz and 2.16 GHz; the sixth value is used to indicate that the STA supports a channel whose frequency band is 60 GHz and bandwidth is 1.08 GHz and 2.16 GHz and a channel whose frequency band is 45 GHz and bandwidth is 1.08 GHz, 2.16 GHz, and 540 MHz; and the seventh value is used to indicate that the STA supports a channel whose frequency band is 60 GHz and bandwidth is 1.08 GHz and 2.16 GHz and a channel whose frequency band is 45 GHz and bandwidth is 1.08 GHz, 2.16 GHz, 540 MHz, and 270 MHz; or the supported channel width set includes: a first value, a second value, a third value or a fourth value, where the first value is used to indicate that the STA supports a channel whose frequency band is 60 GHz and bandwidth is 1.08 GHz; the second value is used to indicate that the STA supports a channel whose frequency band is 60 GHz and bandwidth is 1.08 GHz and 2.16 GHz; the third value is used to indicate that the STA supports a channel whose frequency band is 60 GHz and bandwidth is 1.08 GHz, 2.16 GHz, and 4.32 GHz; and the fourth value is used to indicate that the STA supports a channel whose frequency band is 60 GHz and bandwidth is 1.08 GHz, 2.16 GHz, 4.32 GHz, and 3.24 GHz; or the supported channel width set includes: a first value, a second value, a third value or a fourth value, where the first value is used to indicate that the STA supports a channel whose frequency band is 45 GHz and bandwidth is 1.08 GHz; the second value is used to indicate that the STA supports a channel whose frequency band is 45 GHz and bandwidth is 1.08 GHz and 540 MHz; the third value is used to indicate that the STA supports a channel whose frequency band is 45 GHz and bandwidth is 1.08 GHz, 540 MHz, and 270 MHz; and the fourth value is used to indicate that the STA supports a channel whose frequency band is 45 GHz and bandwidth is 1.08 GHz, 540 MHz, 270 MHz, and 2.16 GHz.

It may be seen from the foregoing summary that: supported channel width sets of multiple STA devices are acquired; and a PCP factor of each STA device that includes a supported channel width set is generated according to the supported channel width set and a DMG capability information element of the each STA device, and a PCP is selected according to the PCP factor of the each STA device. Because the supported channel width set is added in the DMG capability information element, the PCP factor that is generated according to the DMG capability information element also includes the supported channel width set, so that the supported channel width set is used as a selection basis when the PCP is selected according to the PCP factor, and the PCP is selected according to a channel bandwidth support capability of the STA device. Because the channel bandwidth support capability is considered when the PCP is selected, the selected PCP can support a channel bandwidth requirement of a current WLAN, which improves reliability of the WLAN.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 3a is a schematic structural diagram of DMG PCP/AP capability information according to Embodiment 2 of the present invention;

FIG. 3b is a schematic structural diagram of DMG STA capability information according to Embodiment 2 of the present invention;

FIG. 4 is a schematic structural diagram of a PCP factor of an implementation manner according to Embodiment 2 of the present invention;

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
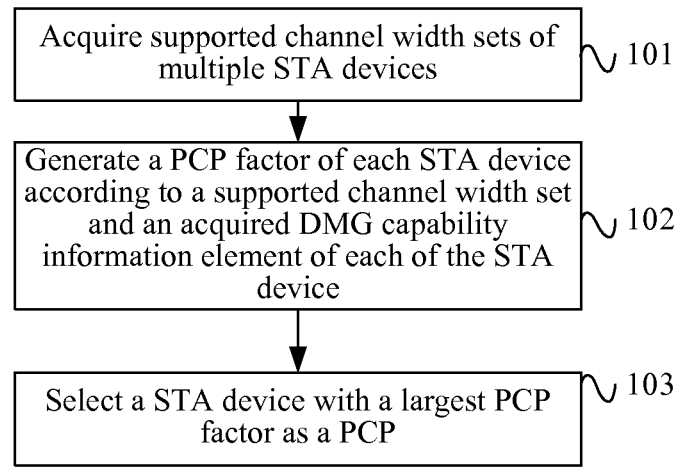
FIG. 1 is a flowchart of a method for selecting a PCP according to Embodiment 1 of the present invention.

FIG. 1 is a flowchart of a method for selecting a PCP according to Embodiment 1 of the present invention. As shown in FIG. 1, the method includes the following process.

Step 101: Acquire supported channel width sets of multiple STA devices.

In this step, either one of the following two implementation manners may be specifically adopted to acquire the supported channel width sets of the multiple STA devices.

Manner 1: Directional multi-gigabit (DMG) capability information elements of the multiple STA devices are acquired, where the DMG capability information elements include the supported channel width sets. Specifically, the supported channel width sets may use a segment of code with a preset length, and content of different supported channel width sets is differentiated according to different values of the code.

Manner 2: Country information elements (Country IE) or supported operating classes information elements (Supported Operating Classes IE) of the multiple STA devices are acquired. The supported channel width sets are acquired according to channel spacing fields and channel starting frequency fields in the country information elements or the supported operating classes information elements. Specifically, for the each STA device, its country information element or supported operating classes information element is acquired, and a supported channel width set is obtained by analyzing operating classes (Operating Classes) information that is included in the country information element or the supported operating classes information element. Specifically, the country information element or the supported operating classes information element includes at least one piece of operating classes (Operating Classes) information, each piece of operating classes information includes a channel spacing (Channel Spacing) field and a channel starting frequency field that are corresponding to an operating class, the channel spacing field of each operating class specifies channel bandwidth of the operating class, and the channel starting frequency field of each operating class specifies a channel frequency band of the operating class. For example, the channel frequency band of the operating class is a frequency band of 60 GHz or a frequency band of 45 GHz, or the operating class not only supports the frequency band of 60 GHz, but also supports the frequency band of 45 GHz. A supported channel frequency band and channel spacing of each operating class can be learnt according to the foregoing channel spacing field and channel starting frequency field, so that content of the supported channel width set is learnt. Specifically, the supported channel width set may use a segment of code with a preset length, and content of different supported channel width sets is differentiated according to different values of the code.

Step 102: Generate a PCP factor of each STA device according to a supported channel width set and an acquired DMG capability information element of the each STA device.

In this step, the PCP factor of the each STA device includes the supported channel width set.

Step 103: Select a STA device with a largest PCP factor as the PCP.

In this step, the STA device with the largest PCP factor is selected as the PCP. If PCP factors of two or more STA devices tie for the largest, that is, there are two or more STA devices whose PCP factors are the same and are a largest value among PCP factors of all STA devices, a STA device with a largest medium access control (MAC) address is selected from the two or more STA devices as the PCP.

In Embodiment 1 of the present invention, because a supported channel width set of a STA device is acquired, a PCP factor that is generated according to the supported channel width set and a DMG capability information element also includes the supported channel width set, so that the supported channel width set is used as a selection basis when a PCP is selected according to the PCP factor, and the PCP is selected according to a channel bandwidth support capability of the STA device. Because the channel bandwidth support capability is considered when the PCP is selected, the selected PCP can meet a channel bandwidth requirement of a current WLAN, which improves reliability of the WLAN.

Figure 2:
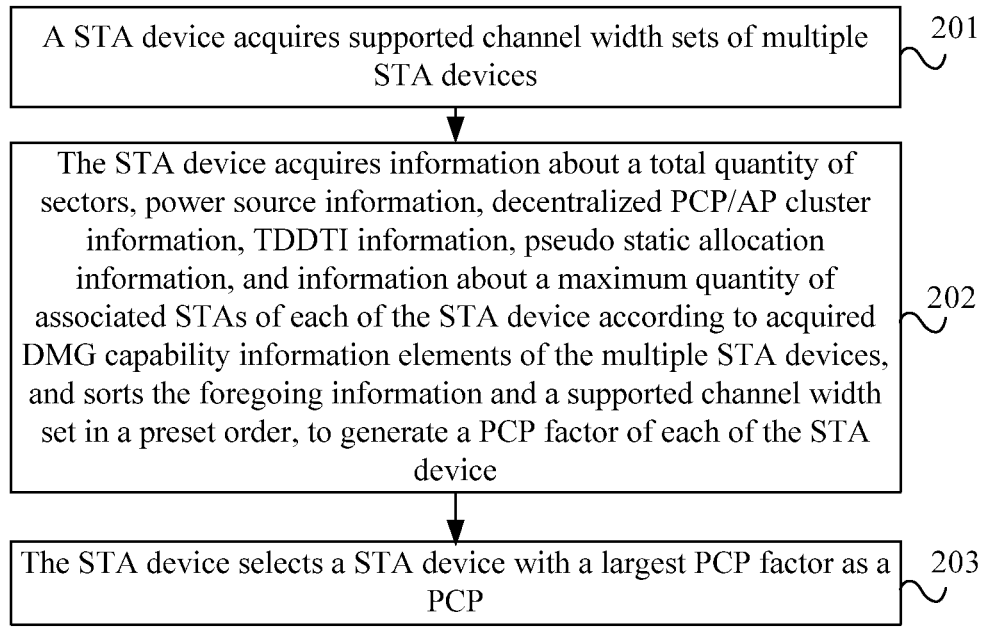
FIG. 2 is a flowchart of a method for selecting a PCP according to Embodiment 2 of the present invention.

FIG. 2 is a flowchart of a method for selecting a PCP according to Embodiment 2 of the present invention. As shown in FIG. 2, the method includes the following process.

Step 201: A STA device acquires supported channel width sets of multiple STA devices.

In this step, either one of the following two implementation manners may be specifically adopted to acquire the supported channel width sets of the multiple STA devices.

Manner 1 of acquiring the supported channel width sets of the multiple STA devices: the STA device acquires DMG capability information elements of the multiple STA devices, where the DMG capability information elements include the supported channel width sets. Specifically, the supported channel width sets may use a segment of code with a preset length, and content of different supported channel width sets is differentiated according to different values of the code.

Specifically, manner 1 of this step may be performed in the following two cases. Case 1: when a STA device accesses a network, the STA device that accesses the network performs step 201 to acquire the DMG capability information elements of the multiple STA devices, where the foregoing DMG capability information elements of the multiple STA devices not only include a DMG capability information element of the STA device that accesses the network, but also includes a DMG capability information element of another STA device that is already in the network. Case 2: when a PCP handover is performed, a STA device that is currently used as the PCP performs step 201 to acquire the DMG capability information elements of the multiple STA devices, where the foregoing DMG capability information elements of the multiple STA devices at least include a DMG capability information element of another STA device that is already in the network. In the foregoing two cases, the STA devices that perform step 201 may both receive, according to the IEEE 802.11ad standard, any one or more of multiple frames such as an association request frame (Association Request Frame) and a probe request frame (Probe Request Frame), and acquire the DMG capability information elements from the one or more frames, where any one or more of the foregoing frames carry the DMG capability information elements. The STA device receives the frame.

In this embodiment of the present invention, the DMG capability information element is improved, and the supported channel width set is added to the DMG capability information element stipulated in the IEEE 802.11ad standard. Specifically, according to the IEEE 802.11ad standard, the DMG capability information element includes: DMG STA capability information and DMG PCP or access point (PCP/AP) capability information, where the DMG STA capability information includes information about a total quantity of sectors; and the DMG PCP/AP capability information includes power source information, decentralized PCP/AP cluster information, time division data transfer interval (TDDTI) information, pseudo static allocation information, and information about a maximum quantity of associated STAs. On a basis that the DMG STA capability information and the DMG PCP/AP capability information include the foregoing information, the supported channel width set that is added in this embodiment of the present invention may be added to the DMG STA capability information, or may be added to the DMG PCP/AP capability information.

Adding the supported channel width set to the DMG PCP/AP capability information is used as an example. FIG. 3a is a schematic structural diagram of the DMG PCP/AP capability information according to Embodiment 2 of the present invention. As shown in FIG. 3a, a manner in this embodiment of the present invention is to extend the DMG PCP/AP capability information in the IEEE 802.11ad standard, a length of the DMG PCP/AP capability information is extended from two bytes to three bytes, and a length field of the DMG capability information element is extended from 17 bytes to 18 bytes. Referring to FIG. 3a, B16-B18 are three significant bits in a new byte that is added to the DMG PCP/AP capability information. The three significant bits are used to indicate the supported channel width set, and the supported channel width set (Supported Channel width set) is used to indicate a channel width set supported by the STA device. In addition, a reserved field in the DMG PCP/AP capability information in the IEEE 802.11ad standard, that is, B15 shown in FIG. 3a, may also be used as an indication field that indicates whether the supported channel width set exists (Channel width set Present), and is used to indicate whether the supported channel width set appears. When this field is set to 1, it indicates that the supported channel width set exists in B16-B18; when this field is set to 0, it indicates that the supported channel width set does not exist in B16-B18. The foregoing values of 0 and 1 and implications indicated by the values may also be exchanged. In the extended one byte, the foregoing three bits B16-B18 are used as the supported channel width set, and the remaining five bits are used as a reserved field, that is, B19 to B23 in FIG. 3a are used as the reserved field.

FIG. 3b is a schematic structural diagram of the DMG STA capability information according to Embodiment 2 of the present invention. As shown in FIG. 3b, another manner in this embodiment of the present invention is to extend the DMG STA capability information in the IEEE 802.11ad standard, a length of the DMG STA capability information is extended from eight bytes to nine bytes, and a length field of the DMG capability information element is expanded from 17 bytes to 18 bytes. Referring to FIG. 3b, B64-B66 are three significant bits in a new byte that is added to the DMG STA capability information. The three significant bits are used to indicate the supported channel width set, and the supported channel width set (Supported Channel width set) is used to indicate a channel width set supported by the STA device. In addition, a reserved field in the STA capability information in the IEEE 802.11ad standard, that is, B62 shown in FIG. 3b, may also be used as an indication field that indicates whether the supported channel width set exists (Channel width set Present), and is used to indicate whether the supported channel width set appears. When this field is set to 1, it indicates that the supported channel width set exists in B64-B66; when this field is set to 0, it indicates that the supported channel width set does not exist in B64-B66. The foregoing values of 0 and 1 and implications indicated by the values may also be exchanged. In the extended one byte, the foregoing three bits B64-B66 are used as the supported channel width set, and the remaining five bits are used as a reserved field, that is, B67 to B71 in FIG. 3b are used as the reserved field.

Manner 2 of acquiring the supported channel width sets of the multiple STA devices: the STA device acquires country information elements or supported operating classes information elements of the multiple STA devices, and acquires the supported channel width sets according to channel spacing fields and channel starting frequency fields in the country information elements or the supported operating classes information elements.

Specifically, the STA device acquires the country information elements or the supported operating classes information elements of the multiple STA devices and obtains the supported channel width sets by analyzing all operating classes information that is included in the country information elements or the supported operating classes information elements. Specifically, the country information elements or the supported operating classes information elements include at least one piece of operating classes information, each piece of operating classes information includes a channel spacing field and a channel starting frequency field that are corresponding to an operating class, the channel spacing field of each operating class specifies channel bandwidth of the operating class, and the channel starting frequency field of each operating class specifies a channel frequency band of the operating class. For example, the channel frequency band of the operating class is a frequency band of 60 GHz or a frequency band of 45 GHz, or the operating class not only supports the frequency band of 60 GHz, but also supports the frequency band of 45 GHz. A supported channel frequency band and channel spacing of each operating class can be learnt according to the foregoing channel spacing field and channel starting frequency field, so that content of the supported channel width sets is learnt. Specifically, the supported channel width sets may use a segment of code with a preset length, and content of different supported channel width sets is differentiated according to different values of the code.

In the foregoing manner 1 and manner 2 of acquiring the supported channel width sets of the multiple STA devices, the supported channel width sets are used to indicate channel width sets supported by the STA devices. Specifically, the supported channel width sets of the STA devices may be represented by different code values of the supported channel width sets, that is, the supported channel width sets may all use a segment of code with the preset length, and the content of different supported channel width sets is differentiated according to different values of the code. The following describes, by using three implementation manners of code of a supported channel width set, a correspondence between a code value of the supported channel width set and content of the supported channel width set. The following three implementation manners of code of a supported channel width set are applicable to the foregoing manner 1 and manner 2 of acquiring the supported channel width sets of the multiple STA devices.

In an implementation manner, a STA device may support two frequency bands of 60 GHZ and 45 GHz. Table 1 is a table of a supported channel width set of a first implementation manner according to Embodiment 2 of the present invention. As shown in Table 1, the supported channel width set may include: a first value, a second value, a third value, a fourth value, a fifth value, a sixth value or a seventh value, where the first value is used to indicate that the STA supports a channel whose frequency band is 60 GHz and bandwidth is 1.08 GHz; the second value is used to indicate that the STA supports a channel whose frequency band is 60 GHz and bandwidth is 1.08 GHz and a channel whose frequency band is 45 GHz and bandwidth is 1.08 GHz; the third value is used to indicate that the STA supports a channel whose frequency band is 60 GHz and bandwidth is 1.08 GHz and 2.16 GHz; the fourth value is used to indicate that the STA supports a channel whose frequency band is 60 GHz and bandwidth is 1.08 GHz and 2.16 GHz and a channel whose frequency band is 45 GHz and bandwidth is 1.08 GHz; the fifth value is used to indicate that the STA supports a channel whose frequency band is 60 GHz and bandwidth is 1.08 GHz and 2.16 GHz and a channel whose frequency band is 45 GHz and bandwidth is 1.08 GHz and 2.16 GHz; the sixth value is used to indicate that the STA supports a channel whose frequency band is 60 GHz and bandwidth is 1.08 GHz and 2.16 GHz and a channel whose frequency band is 45 GHz and bandwidth is 1.08 GHz, 2.16 GHz, and 540 MHz; and the seventh value is used to indicate that the STA supports a channel whose frequency band is 60 GHz and bandwidth is 1.08 GHz and 2.16 GHz and a channel whose frequency band is 45 GHz and bandwidth is 1.08 GHz, 2.16 GHz, 540 MHz, and 270 MHz. Specific values of the first value, the second value, the third value, the fourth value, the fifth value, the sixth value and the seventh value may sequentially be: 001, 010, 011, 100, 101, 110 and 111, and other different values may also be used according to an actual situation as long as the first value to the seventh value can be differentiated.

In another implementation manner, a STA device supports only a frequency band of 60 GHz. Table 2 is a table of a supported channel width set of a second implementation manner according to Embodiment 2 of the present invention. As shown in Table 2, the supported channel width set may include: a first value, a second value, a third value or a fourth value, where the first value is used to indicate that the STA supports a channel whose frequency band is 60 GHz and bandwidth is 1.08 GHz; the second value is used to indicate that the STA supports a channel whose frequency band is 60 GHz and bandwidth is 1.08 GHz and 2.16 GHz; the third value is used to indicate that the STA supports a channel whose frequency band is 60 GHz and bandwidth is 1.08 GHz, 2.16 GHz, and 4.32 GHz; and the fourth value is used to indicate that the STA supports a channel whose frequency band is 60 GHz and bandwidth is 1.08 GHz, 2.16 GHz, 4.32 GHz, and 3.24 GHz. Specific values of the first vale, the second value, the third value and the fourth value may sequentially be: 001, 010, 011, and 100, and other different values may also be used according to an actual situation as long as the first value to the fourth value can be differentiated.

TABLE 1

Table of the supported channel width set of the first implementation manner according to Embodiment 2 of the present invention

| Content of the supported channel width set | Value of the supported channel width set |
|---|---|
| 1.08 GHz (60 GHz) | 001 |
| 1.08 GHz (60 GHz), 1.08 GHz (45 GHz) | 010 |
| 1.08 GHz (60 GHz), 2.16 GHz (60 GHz) | 011 |
| 1.08 GHz (60 GHz), 2.16 GHz (60 GHz), 1.08 GHz (45 GHz) | 100 |
| 1.08 GHz (60Gz), 2.16 GHz (60 GHz), 1.08 GHz (45 GHz), 2.16 GHz (45 GHz) | 101 |
| 1.08 GHz (60 GHz), 2.16 GHz (60 GHz), 1.08 GHz (45 GHz), 2.16 GHz (45 GHz), 540 MHz (45 GHz) | 110 |
| 1.08 GHz (60 GHz), 2.16 GHz (60 GHz), 1.08 GHz (45 GHz), 2.16 GHz (45 GHz), 540 MHz (45 GHz), 270 MHz (45 GHz) | 111 |

In still another implementation manner, a STA device supports only a frequency band of 45 GHz. Table 3 is a table of a supported channel width set of a third implementation manner according to Embodiment 2 of the present invention. As shown in Table 3, the supported channel width set may include: a first value, a second value, a third value or a fourth value, where the first value is used to indicate that the STA supports a channel whose frequency band is 45 GHz and bandwidth is 1.08 GHz; the second value is used to indicate that the STA supports a channel whose frequency band is 45 GHz and bandwidth is 1.08 GHz and 540 MHz; the third value is used to indicate that the STA supports a channel whose frequency band is 45 GHz and bandwidth is 1.08 GHz, 540 MHz, and 270 MHz; and the fourth value is used to indicate that the STA supports a channel whose frequency band is 45 GHz and bandwidth is 1.08 GHz, 540 MHz, 270 MHz, and 2.16 GHz. Specific values of the first vale, the second value, the third value and the fourth value may sequentially be: 001, 010, 011, and 100, and other different values may also be used according to an actual situation as long as the first value to the fourth value can be differentiated.

TABLE 2

Table of the supported channel width set of the second implementation manner according to Embodiment 2 of the present invention

| Content of the supported channel width set | Value of the supported channel width set |
|---|---|
| 1.08 GHz | 001 |
| 1.08 GHz, 2.16 GHz | 010 |
| 1.08 GHz, 2.16 GHz, 4.32 GHz | 011 |
| 1.08 GHz, 2.16 GHz, 4.32 GHz, 3.24 GHz | 100 |

TABLE 3

Table of the supported channel width set of the third implementation manner according to Embodiment 2 of the present invention

| Content of the supported channel width set | Value of the supported channel width set |
|---|---|
| 1.08 GHz | 001 |
| 1.08 GHz, 540 MHz | 010 |
| 1.08 GHz, 540 MHz, 270 MHz | 011 |
| 1.08 GHz, 540 MHz, 270 MHz, 2.16 GHz | 100 |

After step 201, the STA device generates a PCP factor of each STA device according to a DMG capability information element of the each STA device of the multiple STA devices. The following step 202 is specifically included.

Step 202: The STA device acquires information about a total quantity of sectors, power source information, decentralized PCP/AP cluster information, TDDTI information, pseudo static allocation information, and information about a maximum quantity of associated STAs of the each STA device according to acquired DMG capability information elements of the multiple STA devices, and sorts the foregoing information and a supported channel width set in a preset order, to generate a PCP factor of each STA device.

In this step, first, the STA device acquires the DMG capability information elements of the multiple STA devices. In this embodiment of the present invention, a specific method for acquiring the DMG capability information elements of the multiple STA devices by the STA device is not limited as long as the DMG capability information elements can be acquired. Afterwards, the STA device separately acquires, according to the foregoing acquired DMG capability information elements of the multiple STA devices and for the each STA device, the following information from DMG STA capability information of the DMG capability information element of the STA device: the information about the total quantity of sectors, and acquires the following information from DMG PCP/AP capability information of the DMG capability information element of the STA device: the power source information, the decentralized PCP/AP cluster information, the TDDTI information, the pseudo static allocation information, and the information about the maximum quantity of associated STAs. Afterwards, the STA device sorts the foregoing acquired information of the each STA device and the supported channel width set acquired in step 201 in the preset order, to generate the PCP factor of the each STA device. The preset order may include: in a significant bit order of the PCP factor, information in a bit that is most significant than that of the supported channel width set includes the power source information and the decentralized PCP/AP cluster information; and information in a bit that is less significant than that of the supported channel width set includes the TDDTI information, the pseudo static allocation information, the information about the total quantity of sectors, and the information about the maximum quantity of associated STAs. FIG. 4 is a schematic structural diagram of the PCP factor of an implementation manner according to Embodiment 2 of the present invention. As shown in FIG. 4, in an implementation manner, the preset order may be that: in an order from a most significant bit to a less significant bit, a sorting order of the foregoing information is: the power source information, the decentralized PCP/AP cluster information, the supported channel width set, the TDDTI information, the pseudo static allocation information, the information about the total quantity of sectors, and the information about the maximum quantity of associated STAs. In a position whose bit is most significant than that of the power source information and in a position whose bit is less significant than that of the information about the maximum quantity of associated STAs, a reserved field may further be separately set. Alternatively, in another implementation manner, the preset order may further be that: in an order from a most significant bit to a less significant bit, the sorting order of the foregoing information is: the power source information, the supported channel width set, the decentralized PCP/AP cluster information, the TDDTI information, the pseudo static allocation information, the information about the total quantity of sectors, and the information about the maximum quantity of associated STAs.

Step 203: The STA device selects a STA device with a largest PCP factor as the PCP.

In this step, the STA device selects the STA device with the largest PCP factor as the PCP. Further, if PCP factors of two or more STA devices tie for the largest, a STA device with a largest MAC address is selected from the two or more STA devices as the PCP. Specifically, for the case 1 in the foregoing step 201: when a STA device accesses a network, after the STA device that accesses the network performs the foregoing step 201 and step 202, in step 203, a PCP factor of the STA device that accesses the network and a PCP factor of another STA device that is already in the network are compared. If the PCP factor of the STA device that accesses the network is greater than the PCP factor of the another STA device, the STA device that accesses the network is used as the PCP. Further, if PCP factors of the STA device that accesses the network and one or more other STA devices tie for the largest, the STA device performs comparison on MAC addresses of the STA devices whose PCP factors tie for the largest. If a MAC address of the STA device that accesses the network is greater than a MAC address of another STA device whose PCP factor is the same as that of the STA device that accesses the network, the STA device that accesses the network is used as the PCP. For the case 2 in the foregoing step 201: when a PCP handover is performed, after a STA device that is currently used as the PCP performs the foregoing step 201 and step 202, in step 203, PCP factors of other STA devices that are already in the network are compared, and a STA device with a largest PCP factor among the other STA devices that are already in the network is designated as a next PCP. If PCP factors of two or more STA devices tie for the largest, a STA device with a largest MAC address is selected from the two or more STA devices as the next PCP.

In Embodiment 2 of the present invention, because a supported channel width set is added in a DMG capability information element, or the supported channel width set is acquired according to a country information element or a supported operating classes information element, a PCP factor that is generated according to the supported channel width set and the DMG capability information element also includes the supported channel width set, so that the supported channel width set is used as a selection basis when a PCP is selected according to the PCP factor, and the PCP is selected according to a channel bandwidth support capability of a STA device. Because the channel bandwidth support capability is considered when the PCP is selected, the selected PCP can meet a channel bandwidth requirement of a current WLAN, which improves reliability of the WLAN. In addition, the supported channel width set may be flexibly set according to a frequency band of 60 GHz and/or a frequency band of 45 GHz supported by the STA device, and an order of the supported channel width set in the PCP factor may also be set in advance according to an actual situation, which improves application flexibility of a method for selecting a PCP.

Figure 5:
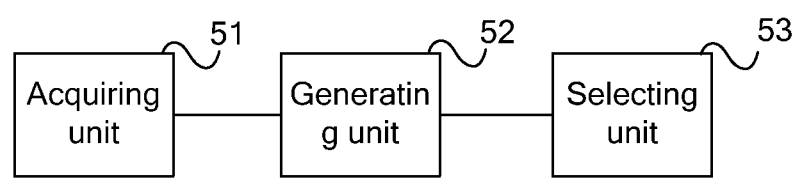
FIG. 5 is a schematic structural diagram of a STA device according to Embodiment 3 of the present invention.

FIG. 5 is a schematic structural diagram of a STA device according to Embodiment 3 of the present invention. As shown in FIG. 5, the STA device at least includes: an acquiring unit 51, a generating unit 52 and a selecting unit 53.

The acquiring unit 51 is configured to acquire supported channel width sets and DMG capability information elements of multiple STA devices.

The generating unit 52 is configured to generate a PCP factor of each STA device according to a supported channel width set and an acquired DMG capability information element of the each STA device, where the PCP factor includes the supported channel width set.

The selecting unit 53 is configured to select a STA device with a largest PCP factor as a PCP.

Based on the foregoing technical solutions, further, the acquiring unit 51 is specifically configured to acquire the DMG capability information elements of the multiple STA devices, where the DMG capability information elements include: DMG STA capability information and DMG PCP/AP capability information, where the DMG STA capability information or the DMG PCP/AP capability information includes the supported channel width sets.

Based on the foregoing technical solutions, further, the acquiring unit 51 is specifically configured to: acquire country information elements or supported operating classes information elements of the multiple STA devices, and acquire the supported channel width sets according to channel spacing fields and channel starting frequency fields in the country information elements or the supported operating classes information elements.

Based on the foregoing technical solutions, further, the DMG capability information element acquired by the acquiring unit 51 includes: DMG STA capability information and DMG PCP/AP capability information. The DMG STA capability information includes information about a total quantity of sectors; the DMG PCP/AP capability information includes power source information, decentralized PCP/AP cluster information, TDDTI information, pseudo static allocation information, and information about a maximum quantity of associated STAs; the generating unit 52 is specifically configured to: acquire the information about the total quantity of sectors, the power source information, the decentralized PCP/AP cluster information, the TDDTI information, the pseudo static allocation information, and the information about the maximum quantity of associated STAs according to the DMG capability information element of the each STA device; and sort the information about the total quantity of sectors, the power source information, the decentralized PCP/AP cluster information, the TDDTI information, the pseudo static allocation information, the information about the maximum quantity of associated STAs, and the supported channel width set in a preset order, to generate the PCP factor of the each STA device.

Based on the foregoing technical solutions, further, the preset order includes: sorting the following information in an order from a most significant bit to a less significant bit: the power source information, the decentralized PCP/AP cluster information, the supported channel width set, the TDDTI information, the pseudo static allocation information, the information about the total quantity of sectors, and the information about the maximum quantity of associated STAs. Alternatively, the preset order includes: sorting the following information in an order from a most significant bit to a less significant bit: the power source information, the supported channel width set, the decentralized PCP/AP cluster information, the TDDTI information, the pseudo static allocation information, the information about the total quantity of sectors, and the information about the maximum quantity of associated STAs.

Based on the foregoing technical solutions, further, the supported channel width set includes: a first value, a second value, a third value, a fourth value, a fifth value, a sixth value or a seventh value, where the first value is used to indicate that the STA supports a channel whose frequency band is 60 GHz and bandwidth is 1.08 GHz; the second value is used to indicate that the STA supports a channel whose frequency band is 60 GHz and bandwidth is 1.08 GHz and a channel whose frequency band is 45 GHz and bandwidth is 1.08 GHz; the third value is used to indicate that the STA supports a channel whose frequency band is 60 GHz and bandwidth is 1.08 GHz and 2.16 GHz; the fourth value is used to indicate that the STA supports a channel whose frequency band is 60 GHz and bandwidth is 1.08 GHz and 2.16 GHz and a channel whose frequency band is 45 GHz and bandwidth is 1.08 GHz; the fifth value is used to indicate that the STA supports a channel whose frequency band is 60 GHz and bandwidth is 1.08 GHz and 2.16 GHz and a channel whose frequency band is 45 GHz and bandwidth is 1.08 GHz and 2.16 GHz; the sixth value is used to indicate that the STA supports a channel whose frequency band is 60 GHz and bandwidth is 1.08 GHz and 2.16 GHz and a channel whose frequency band is 45 GHz and bandwidth is 1.08 GHz, 2.16 GHz, and 540 MHz; and the seventh value is used to indicate that the STA supports a channel whose frequency band is 60 GHz and bandwidth is 1.08 GHz and 2.16 GHz and a channel whose frequency band is 45 GHz and bandwidth is 1.08 GHz, 2.16 GHz, 540 MHz, and 270 MHz; or the supported channel width set includes: a first value, a second value, a third value or a fourth value, where the first value is used to indicate that the STA supports a channel whose frequency band is 60 GHz and bandwidth is 1.08 GHz; the second value is used to indicate that the STA supports a channel whose frequency band is 60 GHz and bandwidth is 1.08 GHz and 2.16 GHz; the third value is used to indicate that the STA supports a channel whose frequency band is 60 GHz and bandwidth is 1.08 GHz, 2.16 GHz, and 4.32 GHz; and the fourth value is used to indicate that the STA supports a channel whose frequency band is 60 GHz and bandwidth is 1.08 GHz, 2.16 GHz, 4.32 GHz, and 3.24 GHz; or the supported channel width set includes: a first value, a second value, a third value or a fourth value, where the first value is used to indicate that the STA supports a channel whose frequency band is 45 GHz and bandwidth is 1.08 GHz; the second value is used to indicate that the STA supports a channel whose frequency band is 45 GHz and bandwidth is 1.08 GHz and 540 MHz; the third value is used to indicate that the STA supports a channel whose frequency band is 45 GHz and bandwidth is 1.08 GHz, 540 MHz, and 270 MHz; and the fourth value is used to indicate that the STA supports a channel whose frequency band is 45 GHz and bandwidth is 1.08 GHz, 540 GHz, 270 MHz, and 2.16 GHz.

The STA device according to Embodiment 3 of the present invention may be configured to execute the methods for selecting a PCP in Embodiment 1 and Embodiment 2 of the present invention. For a specific implementation process and a technical effect, reference may be made to Embodiment 1 and Embodiment 2 of the present invention, and details are not described herein again.

Figure 6:
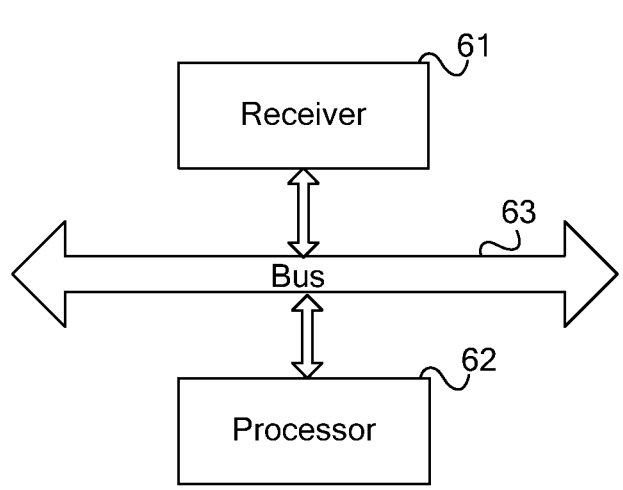
FIG. 6 is a schematic structural diagram of a STA device according to Embodiment 4 of the present invention.

FIG. 6 is a schematic structural diagram of a STA device according to Embodiment 4 of the present invention. As shown in FIG. 6, the STA device at least includes: a receiver 61, a processor 62 and a bus 63.

The receiver 61 is configured to acquire supported channel width sets and directional multi-gigabit DMG capability information elements of multiple STA devices.

The processor 62 is configured to: generate a PCP factor of each STA device according to the supported channel width sets and the acquired DMG capability information elements of the multiple STA devices, and select a STA device with a largest PCP factor as a PCP. The PCP factor includes a supported channel width set.

The bus 63 is configured to implement communication between the receiver 61 and the processor 62.

Based on the foregoing technical solutions, further, the receiver 61 is specifically configured to acquire the DMG capability information elements of the multiple STA devices, where the DMG capability information elements include: DMG STA capability information and DMG PCP/AP capability information, where the DMG STA capability information or the DMG PCP/AP capability information includes the supported channel width sets.

Alternatively, the receiver 61 is specifically configured to: acquire country information elements or supported operating classes information elements of the multiple STA devices, and acquire the supported channel width sets according to channel spacing fields and channel starting frequency fields in the country information elements or the supported operating classes information elements.

Based on the foregoing technical solutions, further, the DMG capability information element acquired by the receiver 61 includes: DMG STA capability information and DMG PCP/AP capability information; the DMG STA capability information includes: information about a total quantity of sectors; the DMG PCP/AP capability information includes: power source information, decentralized PCP/AP cluster information, TDDTI information, pseudo static allocation information, and information about a maximum quantity of associated STAs; and the processor is specifically configured to: acquire the information about the total quantity of sectors, the power source information, the decentralized PCP/AP cluster information, the TDDTI information, the pseudo static allocation information, and the information about the maximum quantity of associated STAs of the each STA device according to a DMG capability information element of the each STA device; and sort the information about the total quantity of sectors, the power source information, the decentralized PCP/AP cluster information, the TDDTI information, the pseudo static allocation information, the information about the maximum quantity of associated STAs, and the supported channel width set in a preset order, to generate the PCP factor of the each STA device, and select the STA device with the largest PCP factor as the PCP.

Based on the foregoing technical solutions, further, the preset order includes: sorting the following information in an order from a most significant bit to a less significant bit: the power source information, the decentralized PCP/AP cluster information, the supported channel width set, the TDDTI information, the pseudo static allocation information, the information about the total quantity of sectors, and the information about the maximum quantity of associated STAs. Alternatively, the preset order includes: sorting the following information in an order from a most significant bit to a less significant bit: the power source information, the supported channel width set, the decentralized PCP/AP cluster information, the TDDTI information, the pseudo static allocation information, the information about the total quantity of sectors, and the information about the maximum quantity of associated STAs.

Based on the foregoing technical solutions, further, the supported channel width set includes: a first value, a second value, a third value, a fourth value, a fifth value, a sixth value or a seventh value, where the first value is used to indicate that the STA supports a channel whose frequency band is 60 GHz and bandwidth is 1.08 GHz; the second value is used to indicate that the STA supports a channel whose frequency band is 60 GHz and bandwidth is 1.08 GHz and a channel whose frequency band is 45 GHz and bandwidth is 1.08 GHz; the third value is used to indicate that the STA supports a channel whose frequency band is 60 GHz and bandwidth is 1.08 GHz and 2.16 GHz; the fourth value is used to indicate that the STA supports a channel whose frequency band is 60 GHz and bandwidth is 1.08 GHz and 2.16 GHz and a channel whose frequency band is 45 GHz and bandwidth is 1.08 GHz; the fifth value is used to indicate that the STA supports a channel whose frequency band is 60 GHz and bandwidth is 1.08 GHz and 2.16 GHz and a channel whose frequency band is 45 GHz and bandwidth is 1.08 GHz and 2.16 GHz; the sixth value is used to indicate that the STA supports a channel whose frequency band is 60 GHz and bandwidth is 1.08 GHz and 2.16 GHz and a channel whose frequency band is 45 GHz and bandwidth is 1.08 GHz, 2.16 GHz, and 540 MHz; and the seventh value is used to indicate that the STA supports a channel whose frequency band is 60 GHz and bandwidth is 1.08 GHz and 2.16 GHz and a channel whose frequency band is 45 GHz and bandwidth is 1.08 GHz, 2.16 GHz, 540 MHz, and 270 MHz; or the supported channel width set includes: a first value, a second value, a third value or a fourth value, where the first value is used to indicate that the STA supports a channel whose frequency band is 60 GHz and bandwidth is 1.08 GHz; the second value is used to indicate that the STA supports a channel whose frequency band is 60 GHz and bandwidth is 1.08 GHz and 2.16 GHz; the third value is used to indicate that the STA supports a channel whose frequency band is 60 GHz and bandwidth is 1.08 GHz, 2.16 GHz, and 4.32 GHz; and the fourth value is used to indicate that the STA supports a channel whose frequency band is 60 GHz and bandwidth is 1.08 GHz, 2.16 GHz, 4.32 GHz, and 3.24 GHz; or the supported channel width set includes: a first value, a second value, a third value or a fourth value, where the first value is used to indicate that the STA supports a channel whose frequency band is 45 GHz and bandwidth is 1.08 GHz; the second value is used to indicate that the STA supports a channel whose frequency band is 45 GHz and bandwidth is 1.08 GHz and 540 MHz; the third value is used to indicate that the STA supports a channel whose frequency band is 45 GHz and bandwidth is 1.08 GHz, 540 MHz, and 270 MHz; and the fourth value is used to indicate that the STA supports a channel whose frequency band is 45 GHz and bandwidth is 1.08 GHz, 540 GHz, 270 MHz, and 2.16 GHz.

The STA device according to Embodiment 3 of the present invention may be configured to execute the methods for selecting a PCP in Embodiment 1 and Embodiment 2 of the present invention. For a specific implementation process and a technical effect, reference may be made to Embodiment 1 and Embodiment 2 of the present invention, and details are not described herein again.

It should be noted that, for ease of description, the foregoing method embodiments are described as a series of action combinations. However, a person skilled in the art should understand that the present invention is not limited to the described sequence of the actions, because some steps may be performed in another sequence or performed at the same time according to the present invention. In addition, a person skilled in the art should also understand that all the embodiments described in this specification belong to exemplary embodiments, and the involved actions and modules are not necessarily mandatory to the present invention.

In the foregoing embodiments, the description of each embodiment has respective focuses. For a part that is not described in detail in an embodiment, reference may be made to related descriptions in other embodiments.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disc, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for selecting a network controller, comprising:
   acquiring supported channel width sets of multiple station (STA) devices;
   generating a personal basic service set (PBSS) control point (PCP) factor of each STA device of the multiple STA devices according to a supported channel width set and an acquired directional multi-gigabit (DMG) capability information element of each STA device, wherein the PCP factor comprises the supported channel width set; and
   selecting an STA device with a largest PCP factor from the multiple STA devices as the network controller;
   wherein the acquiring the supported channel width sets of the multiple STA devices, comprises performing at least one of:
      acquiring DMG capability information elements of the multiple STA devices, wherein the DMG capability information elements comprise DMG STA capability information and DMG PCP or access point (PCP/AP) capability information, wherein the DMG STA capability information or the DMG PCP/AP capability information comprises the supported channel width sets; or
      acquiring country information elements or supported operating classes information elements of the multiple STA devices, and acquiring the supported channel width sets according to channel spacing fields and channel starting frequency fields in at least one of the country information elements or the supported operating classes information elements.

2. The method according to claim 1, wherein the acquired DMG capability information element comprises DMG STA capability information and DMG PCP/AP capability information;
   wherein the DMG STA capability information comprises information about a total quantity of sectors;
   wherein the DMG PCP/AP capability information comprises power source information, decentralized PCP/AP cluster information, time division data transfer interval (TDDTI) information, pseudo static allocation information, and information about a maximum quantity of associated STAs; and
   wherein the generating the PCP factor of each STA device according to a supported channel width set and an acquired DMG capability information element of the each STA device comprises:
   acquiring the information about the total quantity of sectors, the power source information, the decentralized PCP/AP cluster information, the TDDTI information, the pseudo static allocation information, and the information about the maximum quantity of associated STAs of the each STA device according to the DMG capability information element of the each STA device; and
   sorting the information about the total quantity of sectors, the power source information, the decentralized PCP/AP cluster information, the TDDTI information, the pseudo static allocation information, the information about the maximum quantity of associated STAs, and the supported channel width set in a preset order, to generate the PCP factor of the each STA device.

3. The method according to claim 1, wherein the sorting the information in the preset order comprises performing at least one of:
   sorting, the following in an order from a most significant bit to a less significant bit: the power source information, the decentralized PCP/AP cluster information, the supported channel width set, the TDDTI information, the pseudo static allocation information, the information about the total quantity of sectors, and the information about the maximum quantity of associated STAs; or
   sorting, the following in an order from a most significant bit to a less significant bit: the power source information, the supported channel width set, the decentralized PCP/AP cluster information, the TDDTI information, the pseudo static allocation information, the information about the total quantity of sectors, and the information about the maximum quantity of associated STAs.

4. The method according to claim 1, wherein the supported channel width set comprises one or more values that comprise at least one of a first value, a second value, a third value, a fourth value, a fifth value, a sixth value or a seventh value, wherein the first value is used to indicate that the STA supports a channel whose frequency band is 60 GHz and bandwidth is 1.08 GHz, wherein the second value is used to indicate that the STA supports a channel whose frequency band is 60 GHz and bandwidth is 1.08 GHz and a channel whose frequency band is 45 GHz and bandwidth is 1.08 GHz, wherein the third value is used to indicate that the STA supports a channel whose frequency band is 60 GHz and bandwidth is 1.08 GHz and 2.16 GHz, wherein the fourth value is used to indicate that the STA supports a channel whose frequency band is 60 GHz and bandwidth is 1.08 GHz and 2.16 GHz and a channel whose frequency band is 45 GHz and bandwidth is 1.08 GHz, wherein the fifth value is used to indicate that the STA supports a channel whose frequency band is 60 GHz and bandwidth is 1.08 GHz and 2.16 GHz and a channel whose frequency band is 45 GHz and bandwidth is 1.08 GHz and 2.16 GHz, wherein the sixth value is used to indicate that the STA supports a channel whose frequency band is 60 GHz and bandwidth is 1.08 GHz and 2.16 GHz and a channel whose frequency band is 45 GHz and bandwidth is 1.08 GHz, 2.16 GHz, and 540 MHz, and wherein the seventh value is used to indicate that the STA supports a channel whose frequency band is 60 GHz and bandwidth is 1.08 GHz and 2.16 GHz and a channel whose frequency band is 45 GHz and bandwidth is 1.08 GHz, 2.16 GHz, 540 MHz, and 270 MHz; or
   one or more values that comprise at least one a first value, a second value, a third value or a fourth value, wherein the first value is used to indicate that the STA supports a channel whose frequency band is 60 GHz and bandwidth is 1.08 GHz, wherein the second value is used to indicate that the STA supports a channel whose frequency band is 60 GHz and bandwidth is 1.08 GHz and 2.16 GHz, wherein the third value is used to indicate that the STA supports a channel whose frequency band is 60 GHz and bandwidth is 1.08 GHz, 2.16 GHz, and 4.32 GHz, and wherein the fourth value is used to indicate that the STA supports a channel whose frequency band is 60 GHz and bandwidth is 1.08 GHz, 2.16 GHz, 4.32 GHz, and 3.24 GHz; or
   one or more values that comprise at least one of a first value, a second value, a third value or a fourth value, wherein the first value is used to indicate that an STA supports a channel whose frequency band is 45 GHz and bandwidth is 1.08 GHz, wherein the second value is used to indicate that the STA supports a channel whose frequency band is 45 GHz and bandwidth is 1.08

GHz and 540 MHz, wherein the third value is used to indicate that the STA supports a channel whose frequency band is 45 GHz and bandwidth is 1.08 GHz, 540 MHz, and 270 MHz, and wherein the fourth value is used to indicate that the STA supports a channel whose frequency band is 45 GHz and bandwidth is 1.08 GHz, 540 GHz, 270 MHz, and 2.16 GHz.

5. The method according to claim 1, further comprising: selecting, as the network controller, a STA device with a largest medium access control (MAC) address from at least two STA devices whose PCP factors are the same and are a largest value among PCP factors of the multiple STA devices.

6. The method according to claim 1, wherein the network controller is a PCP.

7. A station (STA) device, comprising:
a receiver configured to acquire supported channel width sets and directional multi-gigabit DMG) capability information elements of multiple STA devices, wherein the receiver is further configured to perform at least one of:
   acquire the DMG capability information elements of the multiple STA devices, wherein the DMG capability information elements comprise DMG STA capability information and DMG PCP or access point (PCP/AP) capability information, wherein the DMG STA capability information or the DMG PCP/AP capability information comprises the supported channel width sets, or
   acquire country information elements or supported operating classes information elements of the multiple STA devices, and acquire the supported channel width sets according to channel spacing fields and channel starting frequency fields in at least one of the country information elements or the supported operating classes information elements;
a processor;
a non-transitory computer readable medium connected to the processor and having stored thereon instructions that, when executed by the processor, cause the processor to:
   generate a personal basic service set (PBSS) control point (PCP) factor of each STA device of the multiple STA devices according to a supported channel width set and an acquired DMG capability information element of the each STA device, wherein the PCP factor comprises the supported channel width set, and select a STA device with a largest PCP factor as a PCP; and
a bus, configured to implement communication between the receiver and the processor.

8. The device according to claim 7, wherein the DMG capability information element acquired by the receiver comprises DMG STA capability information and DMG PCP/AP capability information;
   wherein the DMG STA capability information comprises information about a total quantity of sectors;
   wherein the DMG PCP/AP capability information comprises power source information, decentralized PCP/AP cluster information, time division data transfer interval (TDDTI) information, pseudo static allocation information, and information about a maximum quantity of associated STAs; and
   wherein the non-transitory computer readable medium further has stored thereon instructions that, when executed by the processor, cause the processor to:
      acquire the information about the total quantity of sectors, the power source information, the decentralized PCP/AP cluster information, the TDDTI information, the pseudo static allocation information, and the information about the maximum quantity of associated STAs of the each STA device according to the DMG capability information element of the each STA device; and
      sort the information about the total quantity of sectors, the power source information, the decentralized PCP/AP cluster information, the TDDTI information, the pseudo static allocation information, the information about the maximum quantity of associated STAs, and the supported channel width set in a preset order, to generate the PCP factor of the each STA device, and select the STA device with the largest PCP factor as the PCP.

9. The device according to claim 8, wherein the instructions causing the processor to sort the information in a preset order comprise instructions that, when executed by the processor, cause the processor to perform at least one of:
   sorting the following in an order from a most significant bit to a less significant bit: the power source information, the decentralized PCP/AP cluster information, the supported channel width set, the TDDTI information, the pseudo static allocation information, the information about the total quantity of sectors, and the information about the maximum quantity of associated STAs; or
   sorting the following in an order from a most significant bit to a less significant bit: the power source information, the supported channel width set, the decentralized PCP/AP cluster information, the TDDTI information, the pseudo static allocation information, the information about the total quantity of sectors, and the information about the maximum quantity of associated STAs.

10. The device according to claim 7, wherein the supported channel width set comprises one or more values that comprise at least one of a first value, a second value, a third value, a fourth value, a fifth value, a sixth value or a seventh value, wherein the first value is used to indicate that the STA supports a channel whose frequency band is 60 GHz and bandwidth is 1.08 GHz, wherein the second value is used to indicate that the STA supports a channel whose frequency band is 60 GHz and bandwidth is 1.08 GHz and a channel whose frequency band is 45 GHz and bandwidth is 1.08 GHz, wherein the third value is used to indicate that the STA supports a channel whose frequency band is 60 GHz and bandwidth is 1.08 GHz and 2.16 GHz, wherein the fourth value is used to indicate that the STA supports a channel whose frequency band is 60 GHz and bandwidth is 1.08 GHz and 2.16 GHz and a channel whose frequency band is 45 GHz and bandwidth is 1.08 GHz, wherein the fifth value is used to indicate that the STA supports a channel whose frequency band is 60 GHz and bandwidth is 1.08 GHz and 2.16 GHz and a channel whose frequency band is 45 GHz and bandwidth is 1.08 GHz and 2.16 GHz, wherein the sixth value is used to indicate that the STA supports a channel whose frequency band is 60 GHz and bandwidth is 1.08 GHz and 2.16 GHz and a channel whose frequency band is 45 GHz and bandwidth is 1.08 GHz, 2.16 GHz, and 540 MHz; and the seventh value is used to indicate that the STA supports a channel whose frequency band is 60 GHz and bandwidth is 1.08 GHz and 2.16 GHz and a channel whose frequency band is 45 GHz and bandwidth is 1.08 GHz, 2.16 GHz, 540 MHz, and 270 MHz; or one or more values that comprise at least one of a first value, a second value, a third value or a fourth value, wherein the first value is used to indicate that the STA supports a channel whose frequency band is 60 GHz and bandwidth is 1.08 GHz, wherein the second value is used to indicate that the STA supports a channel whose frequency band is 60 GHz and bandwidth is 1.08 GHz and 2.16 GHz, wherein the third value is used to indicate that the STA supports a channel whose frequency band is 60 GHz and bandwidth is 1.08 GHz, 2.16 GHz, and 4.32 GHz, and wherein the fourth value is used to indicate that the STA supports a channel whose frequency band is 60 GHz and bandwidth is 1.08 GHz, 2.16 GHz, 4.32 GHz, and 3.24 GHz; or one or more values that comprise at least one of a first value, a second value, a third value or a fourth value, wherein the first value is used to indicate that the STA supports a channel whose frequency band is 45 GHz and bandwidth is 1.08 GHz, wherein the second value is used to indicate that the STA supports a channel whose frequency band is 45 GHz and bandwidth is 1.08 GHz and 540 MHz, wherein the third value is used to indicate that the STA supports a channel whose frequency band is 45 GHz and bandwidth is 1.08 GHz, 540 MHz, and 270 MHz, and wherein the fourth value is used to indicate that the STA supports a channel whose frequency band is 45 GHz and bandwidth is 1.08 GHz, 540 GHz, 270 MHz, and 2.16 GHz.

11. The device according to claim 7, wherein the non-transitory computer readable medium further has stored thereon instructions that, when executed by the processor, cause the processor to select a STA device with a largest medium access control (MAC) address from at least two STA devices whose PCP factors are the same and are a largest value among PCP factors of the multiple STA devices as a PCP.

12. A station (STA) device, comprising:
a receiver, configured to acquire a supported channel width set and directional multi-gigabit DMG) capability information element of a first STA devices, wherein the receiver is further configured to perform at least one of:
acquire the DMG capability information element of the first STA device, wherein the DMG capability information element comprise: DMG STA capability information and DMG PCP or access point (PCP/AP) capability information, wherein the DMG STA capability information or the DMG PCP/AP capability information comprises the supported channel width set; or,
acquire a country information element of the first STA device or a supported operating classes information element of the first STA device, and acquire the supported channel width set according to at least one of a channel spacing field and a channel starting frequency field in the country information element or a channel spacing field and a channel starting frequency field in the supported operating classes information element;
a processor;
a non-transitory computer readable medium connected to the processor and having stored thereon instructions that, when executed by the processor, cause the processor to:
generate a personal basic service set (PBSS) control point (PCP) factor of the first STA device according to the supported channel width set and the DMG capability information element of the first STA devices, wherein the PCP factor comprises the supported channel width set; and
select the first STA device as a PCP in response to the PCP factor of the first STA device being the largest PCP factor; and
a bus, configured to implement communication between the receiver and the processor.

13. The device according to claim 12, wherein the DMG capability information element acquired by the receiver comprises DMG STA capability information and DMG PCP/AP capability information;
wherein the DMG STA capability information comprises information about a total quantity of sectors;
wherein the DMG PCP/AP capability information comprises: power source information, decentralized PCP/AP cluster information, time division data transfer interval (TDDTI) information, pseudo static allocation information, and information about a maximum quantity of associated STAs; and
wherein the non-transitory computer readable medium further has stored thereon instructions that, when executed by the processor, cause the processor to:
acquire the information about the total quantity of sectors, the power source information, the decentralized PCP/AP cluster information, the TDDTI information, the pseudo static allocation information, and the information about the maximum quantity of associated STAs of the first STA device according to the DMG capability information element of the first STA device; and
sort the information about the total quantity of sectors, the power source information, the decentralized PCP/AP cluster information, the TDDTI information, the pseudo static allocation information, the information about the maximum quantity of associated STAs, and the supported channel width set in a preset order, to generate the PCP factor of the first STA device, and if the PCP factor of the first STA device is the largest PCP factor, select the first STA device as the PCP.

14. The device according to claim 13, wherein the instructions causing the processor to sort the information in a preset order comprise instructions that, when executed by the processor, cause the processor to perform at least one of:
sorting the following in an order from a most significant bit to a less significant bit: the power source information, the decentralized PCP/AP cluster information, the supported channel width set, the TDDTI information, the pseudo static allocation information, the information about the total quantity of sectors, and the information about the maximum quantity of associated STAs; or
sorting the following in an order from a most significant bit to a less significant bit: the power source information, the supported channel width set, the decentralized PCP/AP cluster information, the TDDTI information, the pseudo static allocation information, the information about the total quantity of sectors, and the information about the maximum quantity of associated STAs.

15. The device according to claim 12, wherein the supported channel width set comprises one or more values that comprise at least one of a first value, a second value, a third value, a fourth value, a fifth value, a sixth value or a seventh value, wherein the first value is used to indicate that the STA supports a channel whose frequency band is 60 GHz and bandwidth is 1.08 GHz, wherein the second value is used to indicate that the STA supports a channel whose frequency band is 60 GHz and bandwidth is 1.08 GHz and a channel whose frequency band is 45 GHz and bandwidth is 1.08 GHz, wherein the third value is used to indicate that the STA supports a channel whose frequency band is 60 GHz and bandwidth is 1.08 GHz and 2.16 GHz, wherein the fourth value is used to indicate that the STA supports a channel whose frequency band is 60 GHz and bandwidth is 1.08 GHz and 2.16 GHz and a channel whose frequency band is 45 GHz and bandwidth is 1.08 GHz, wherein the fifth value is used to indicate that the STA supports a channel whose frequency band is 60 GHz and bandwidth is 1.08 GHz and 2.16 GHz and a channel whose frequency band is 45 GHz and bandwidth is 1.08 GHz and 2.16 GHz, wherein the sixth value is used to indicate that the STA supports a channel whose frequency band is 60 GHz and bandwidth is 1.08 GHz and 2.16 GHz and a channel whose frequency band is 45 GHz and bandwidth is 1.08 GHz, 2.16 GHz, and 540 MHz, and wherein the seventh value is used to indicate that the STA supports a channel whose frequency band is 60 GHz and bandwidth is 1.08 GHz and 2.16 GHz and a channel whose frequency band is 45 GHz and bandwidth is 1.08 GHz, 2.16 GHz, 540 MHz, and 270 MHz; or one or more values that comprise at least one a first value, a second value, a third value or a fourth value, wherein the first value is used to indicate that the STA supports a channel whose frequency band is 60 GHz and bandwidth is 1.08 GHz, wherein the second value is used to indicate that the STA supports a channel whose frequency band is 60 GHz and bandwidth is 1.08 GHz and 2.16 GHz, wherein the third value is used to indicate that the STA supports a channel whose frequency band is 60 GHz and bandwidth is 1.08 GHz, 2.16 GHz, and 4.32 GHz, and wherein the fourth value is used to indicate that the STA supports a channel whose frequency band is 60 GHz and bandwidth is 1.08 GHz, 2.16 GHz, 4.32 GHz, and 3.24 GHz; or one or more values that comprise at least one a first value, a second value, a third value or a fourth value, wherein the first value is used to indicate that the STA supports a channel whose frequency band is 45 GHz and bandwidth is 1.08 GHz, wherein the second value is used to indicate that the STA supports a channel whose frequency band is 45 GHz and bandwidth is 1.08 GHz and 540 MHz, wherein the third value is used to indicate that the STA supports a channel whose frequency band is 45 GHz and bandwidth is 1.08 GHz, 540 MHz, and 270 MHz, and wherein the fourth value is used to indicate that the STA supports a channel whose frequency band is 45 GHz and bandwidth is 1.08 GHz, 540 GHz, 270 MHz, and 2.16 GHz.

16. The device according to claim 12, wherein the processor is further configured to select the first STA device as the PCP in response to the PCP factor of the first STA device being the largest PCP factor and the medium access control (MAC) address of the first STA device being the largest MAC address.

* * * * *